US012801769B2

(12) United States Patent
Wei et al.

(10) Patent No.: US 12,801,769 B2
(45) Date of Patent: Nov. 17, 2026

(54) CONTROL METHOD, CONTROL DEVICE, AND ELECTRONIC DEVICE

(71) Applicant: Lenovo (Beijing) Limited, Beijing (CN)

(72) Inventors: Jun Wei, Beijing (CN); Yuanqing Liu, Beijing (CN); Yan Long, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 182 days.

(21) Appl. No.: 18/612,715

(22) Filed: Mar. 21, 2024

(65) Prior Publication Data

US 2024/0320358 A1 Sep. 26, 2024

(30) Foreign Application Priority Data

Mar. 23, 2023 (CN) ........................ 202310293666.X

(51) Int. Cl.

| | |
|---|---|
| ***G06F 21/62*** | (2013.01) |
| ***G06F 3/14*** | (2006.01) |
| ***G06F 3/16*** | (2006.01) |
| ***H04N 23/695*** | (2023.01) |

(52) U.S. Cl.
CPC ............ *G06F 21/6218* (2013.01); *G06F 3/14* (2013.01); *G06F 3/16* (2013.01); *H04N 23/695* (2023.01)

(58) Field of Classification Search
CPC .......... G06F 21/6218; G06F 3/14; G06F 3/16; H04N 23/695
USPC ............................................................ 726/26
See application file for complete search history.

(56) References Cited

U.S. PATENT DOCUMENTS

2022/0188456 A1* 6/2022 Vaughan ................. G06F 21/35

FOREIGN PATENT DOCUMENTS

CN 115480632 A * 12/2022 ........... G06F 1/1686

* cited by examiner

*Primary Examiner* — Zi Ye
(74) *Attorney, Agent, or Firm* — ANOVA LAW GROUP, PLLC

(57) ABSTRACT

A control method includes monitoring pose change information of an electronic device, and controlling an operating parameter of a target detector based on the pose change information, to control an output parameter of the electronic device according to detection data of the target detector.

18 Claims, 7 Drawing Sheets

CONTROL METHOD, CONTROL DEVICE, AND ELECTRONIC DEVICE

CROSS-REFERENCE TO RELATED APPLICATION

This application claims priority to Chinese Patent Application No. 202310293666.X, filed on Mar. 23, 2023, the entire content of which is incorporated herein by reference.

TECHNICAL FIELD

The present disclosure generally relates to the field of computer technologies and, more particularly, to a control method, a control device, and an electronic device.

BACKGROUND

To improve privacy protection when an electronic device outputs data, a detector is usually set for the electronic device to detect surrounding environmental data of the electronic device, and privacy protection is performed on the output data of the electronic device according to the detection data. In practical applications, the detector is only able to perform data detection on the electronic device at a fixed position or angle. When the position, angle, or shape of the electronic device changes, the detector cannot detect the data of the electronic device, or the detection data obtained after detection is different from the actual data to be detected, thus failing to achieve the purpose of protecting the privacy of the electronic device.

SUMMARY

In accordance with the present disclosure, there is provided a control method including monitoring pose change information of an electronic device, and controlling an operating parameter of a target detector based on the pose change information, to control an output parameter of the electronic device according to detection data of the target detector.

Also in accordance with the present disclosure, there is provided a control device including a monitor assembly configured to monitor pose change information of an electronic device, and a control assembly configured to control an operating parameter of a target detector based on the pose change information, to control an output parameter of the electronic device according to detection data of the target detector.

Also in accordance with the present disclosure, there is provided an electronic device including a body configured to be in one of a plurality of different poses, and a controller provided at the body and configured to control an operating parameter of a target detector based on pose change information of the electronic device, to control an output parameter of the electronic device according to detection data of the target detector.

DETAILED DESCRIPTION OF THE EMBODIMENTS

Specific embodiments of the present disclosure are hereinafter described with reference to the accompanying drawings. The described embodiments are merely examples of the present disclosure and should not be regarded as limitations of this application. All other embodiments obtained by those of ordinary skill in the art without creative efforts fall within the scope of protection of the present disclosure.

In the present disclosure, reference is made to "some embodiments" which describe a subset of all possible embodiments, but it is understood that "some embodiments" may be the same subset or a different subset of all possible embodiments, and can be combined with each other without conflict.

The terms "first/second/third" involved are only used to distinguish similar objects and do not represent a specific ordering of objects. It is understood that "first/second/third" can be used interchangeably if permitted. The specific order or sequence may be changed such that the embodiments of the present disclosure described herein can be implemented in an order other than that illustrated or described herein. The term "include," "comprise," "contain," or any variation thereof, is intended to encompass non-exclusive inclusion, such that the process, method, item, or device including a series of elements not only includes those elements explicitly listed, but also includes other elements not explicitly listed or inherent to such process, method, item, or device. In the absence of further limitations, an element associated with the phrase "including a . . . " does not exclude the presence of another identical element in the process, method, item, or device including the stated element.

Unless otherwise defined, all technical and scientific terms used herein have the same meaning as commonly understood by those of ordinary skill in the art in the technical field to which the present disclosure belongs. The terminology used herein is for the purpose of describing the present disclosure only and is not intended to limit the scope of the present disclosure.

The embodiments of the present disclosure may be used in a wide range of general or specialized computing device environments or configurations, including, for example: personal computers, server computers, handheld or portable devices, tablet devices, multiprocessor devices, distributed computing environments including any of the above devices, etc.

Figure 1:
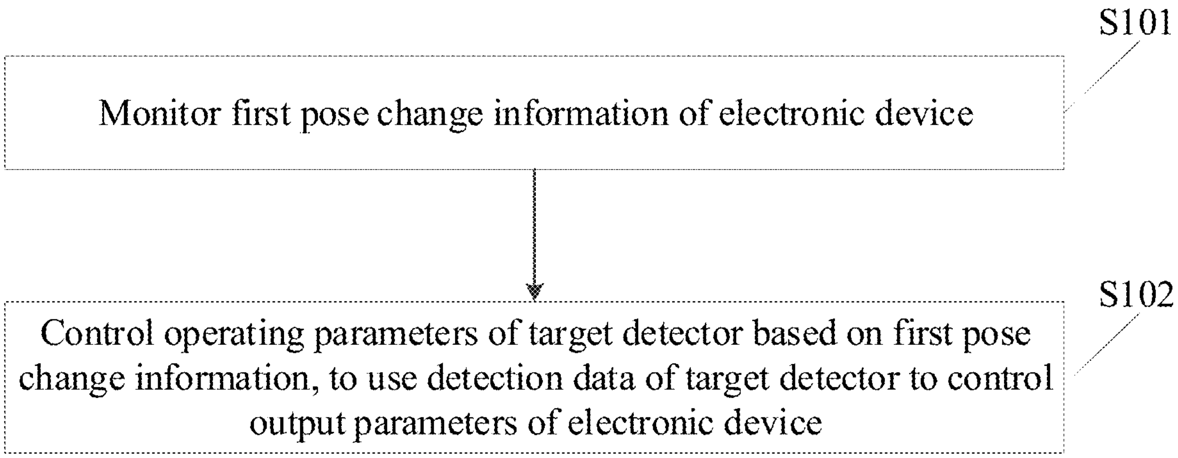
FIG. 1 is a flow chart of a control method consistent with the present disclosure.

The present disclosure provides a control method. The control method may be applied to a large variety of system platforms, and an execution body of the control method may be a computer terminal or a processor of various mobile devices. In one embodiment shown in FIG. 1 which is a flow chart of the control method, the method includes S101 to S102.

In S101, first pose change information of an electronic device is monitored.

In one embodiment, the pose change information may at least include position change information, attitude change information, or device morphology change information.

In the present disclosure, the implementation of monitoring the first pose change information of the electronic device may include one or more of the following embodiments.

In one embodiment, the implementation of monitoring the first pose change information of the electronic device may include: monitoring the first pose change information of the electronic device by using captured data of at least one sensor disposed at the electronic device.

The at least one sensor arranged on the electronic device may include at least one of a G-sensor (gravity sensor), a Hall sensor, a camera, an IR sensor, or an angle sensor. A position of the at least one sensor disposed at the electronic device may be different from a position of a target detector disposed at the electronic device. For example, in one embodiment, the at least one sensor can be disposed at a screen or a bracket of the electronic device.

In another embodiment, the implementation of monitoring the first pose change information of the electronic device may include: monitoring the first pose change information of the electronic device by using pose data returned by at least one sensor in a target detector disposed at the electronic device.

The target detector disposed at the electronic device may include at least one sensor, and the at least one sensor of the target detector may detect the pose data of the electronic device, and obtain the first pose change information of the electronic device according to the pose data.

The at least one sensor disposed inside the target detector may include at least one of a G-sensor (gravity sensor), a Hall sensor, a camera, an IR sensor, or an angle sensor. The target detector may be disposed at a top end or a side end of a screen of the electronic device, or on a top end of the bracket of the electronic device.

In another embodiment, the implementation of monitoring the first pose change information of the electronic device may include: monitoring the first pose change information of the electronic device by using the detection data of the target detector. The target detector may or may not be disposed at the electronic device.

The target detector may perform data detection on the pose change of the electronic device according to detection manners such as a preset detection direction or a preset detection region, to determine the pose change of the electronic device according to the detection data and obtain the first pose change information of the electronic device. The detection data may be image data or radar data, etc. According to the image data, the radar data, or change of the detection region and detection direction, the pose change of the electronic device may be analyzed.

In another embodiment, the implementation of monitoring the first pose change information of the electronic device may include: obtaining control information of the electronic device and obtaining the first pose change information of the electronic device based on the control information. The control information may be able to trigger the pose change of the electronic device.

The control information may include angle control information or mode control information. The control information applied to the electronic device may be control information directly applied to an input component of the electronic device. For example, controlling the electronic device to change the pose through the control information of the input component may include using a mouse to control the pose of the electronic device to change. In some other embodiments, the control information applied to the electronic device may also be the control information from other devices. For example, controlling the electronic device to change the pose through the control information of the other device may include using a remote controller to remotely control the pose of the electronic device to change.

In another embodiment, the implementation of monitoring the first pose change information of the electronic device may include: monitoring the first pose change information of the electronic device based on interactive data between the electronic device and a target object.

The target object may be a person or another device. When the target object is a person, the interactive data between the electronic device and the person may be force data exerted by the person on the electronic device. When the target object is another device, the interactive data between the electronic device and the another device may be the communication interactive data in the context of the data interaction between the electronic device and the another device.

In S102, operating parameters of the target detector are controlled according to the first pose change information, such that the detection data of the target detector is used to control output parameters of the electronic device.

The target detector may or may not belong to the electronic device.

In one embodiment, there may be one target detector. In some other embodiments, there may be a plurality of target detectors. When there are a plurality of target detectors, detectors corresponding to different poses may be selected as the target detectors, and each target detector may work at the same time.

Controlling the operating parameters of the target detector may include adjusting the angle, intensity or operating status of the target detector. In some embodiments where there are a plurality of target detectors, the controlled operating parameters corresponding to different target detectors may be different, and the detection data of the target detectors under different operating parameters may be different.

After obtaining the detection data of the target detector, the output parameters of the electronic device may be controlled according to the detection data. The output parameters may include display output parameters, sound output parameters or power supply data parameters, etc.

Figure 2:
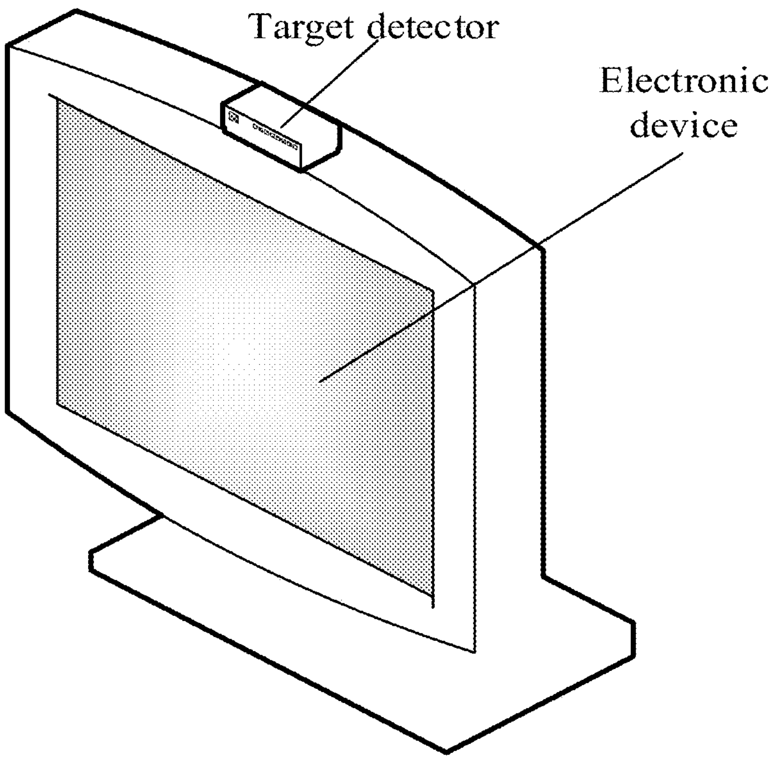
FIG. 2 is a schematic structural diagram showing an electronic device having a target detector consistent with the present disclosure.
Figure 3:
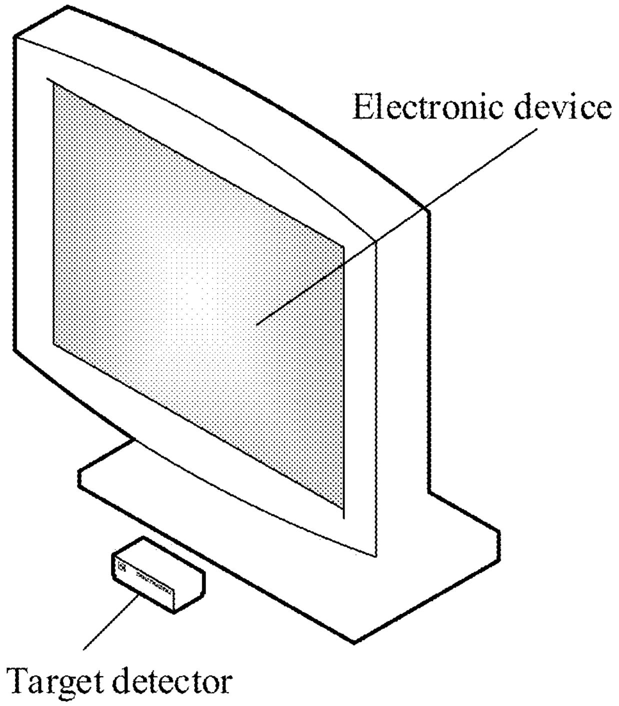
FIG. 3 is a schematic structural diagram showing an electronic device not having a target detector consistent with the present disclosure.

In various embodiments, the target detector may or may not belong to the electronic device. In one embodiment, that the target detector belongs to the electronic device may indicate that the target detector is directly inserted into the electronic device (as shown in FIG. 2). In other embodiments, that the target detector does not belong to an electronic device may indicate that the target detector has a non-physical connection relationship with the electronic device (as shown in FIG. 3), for example, a wireless communication connection.

In the present disclosure, by monitoring the first pose change information of the electronic device, the operating parameters of the target detector may controlled, such that the target detector is able to work under the operating parameters to control the output parameters of the electronic device according to the obtained detection data of the target detector. The operating parameters of the detector may be controlled when the pose of the electronic device changes. Therefore, the operating parameters may be adjusted in time according to the changes in the electronic device, such that the detector after adjusting the operating parameters is used to perform data detection on the electronic device to obtain more accurate detection data and protect the privacy of output data of the electronic device.

In the present disclosure, the implementation of controlling the operating parameters of the target detector according to the first pose change information may include one or more of following manners.

In a first manner of implementation, controlling the operating parameters of the target detector according to the first pose change information may include: determining second pose change information of the target detector based on the first pose change information, and controlling a detection region of the target detector based on the second pose change information, to at least make the detection region of the target detector match the first pose change information of the electronic device.

In one embodiment, the target detector may belong to the electronic device. Since the target detector cannot be disassembled, when the pose of the electronic device changes, the pose of the target detector may change at the same time. The second pose change information may be consistent with the first pose change information. In some other embodiments, the target detector may not belong to the electronic device. When the target detector is nested on the electronic device, the second pose change information may be consistent with the first pose change information. When the target detector is independent of the electronic device, a positional relationship between the electronic device and the target detector may be determined based on the first pose change information, and the second pose change information of the target detector may be determined based on the positional relationship.

Figure 4:
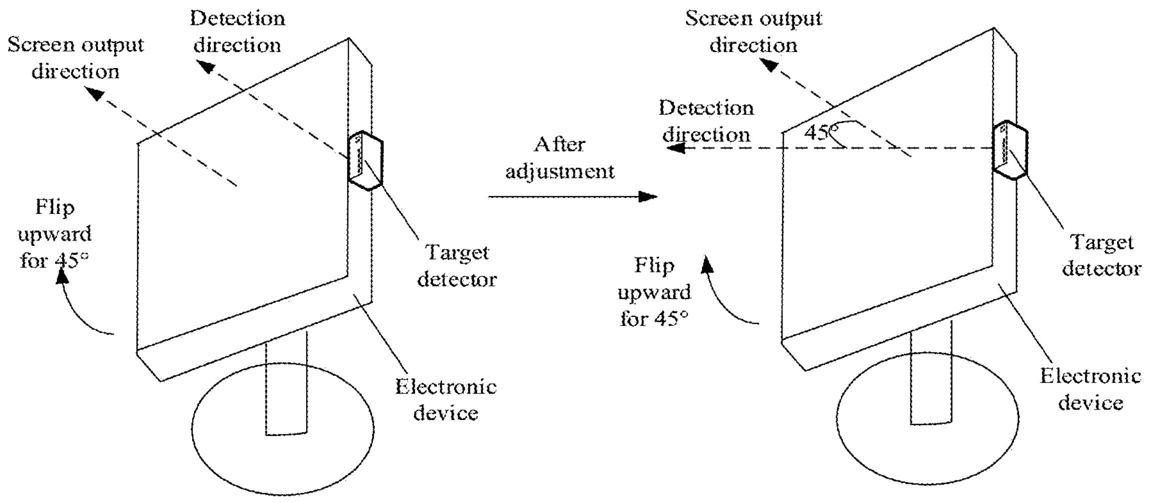
FIG. 4 is a schematic diagram showing controlling a detection direction of a target detector consistent with the present disclosure.

For example, when the target detector belongs to the electronic device, as shown in FIG. 4, the pose of the electronic device may change (for example, may flip upward for 45°). At this time, the detection direction of the target detector belonging to the electronic device may be consistent with the output direction of the screen of the electronic device. After obtaining the first pose change information of the electronic device, the detection direction of the target detector may be adjusted, and the detection direction after adjustment may form a 45° angle with the screen output direction. Before and after the adjustment, the detection region of the target detector may change.

In one embodiment, the detection region of the target detector may include a detection direction and a detection range. When the pose of the electronic device changes, the detection range of the target detector may be controlled to reversely compensate for the change in the pose of the electronic device or to prevent the pose of the electronic device from changing.

In a second manner of implementation, controlling the operating parameters of the target detector according to the first pose change information may include: obtaining a relative positional relationship between the target detector and the electronic device, and controlling the detection region of the target detector based on the first pose change information and the relative positional relationship.

For example, in one embodiment, the target detector may be independent of the electronic device. When the electronic device is displaced, the electronic device may exceed the detection region of the target detector. The adjustment parameters of the target detector may be determined according to the first pose change information and the relative positional relationship between the target detector and the electronic device, to adjust the detection region of the target detector.

In another embodiment, the target detector may be disposed at the electronic device. When the pose or form of the electronic device changes, based on the relative positional relationship between the target detector and the electronic device, a change amount of the detection region of the target detector relative to the electronic device may be determined, to determine the adjustment parameters of the target detector and adjust the detection region of the target detector.

In a third manner of implementation, controlling the operating parameters of the target detector according to the first pose change information may include: controlling a power consumption state of the target detector based on the first pose change information.

In one embodiment, controlling the power consumption state of the target detector may include: increasing the power of the target detector to expand the detection range of the target detector, or setting the target detector to a low power consumption mode. In the low power consumption mode, the target detector may reduce the detection range or stop detection. For example, in one embodiment, based on the first pose change information, it may be determined that the target detector is able to expand the detection range by increasing the power, and then the power enhancement process may be performed on the target detector. In another embodiment, based on the first pose change information, it may be determined that the electronic device is closed or the target detector moves into an uninhabited operating parameter, which means that the target detector is not able to perform detection or the detection data of the target detector is not able to perform privacy protection. Therefore, the target detector may be controlled to be in a low power consumption mode.

In a fourth manner of implementation, controlling the operating parameters of the target detector according to the first pose change information may include: obtaining the second pose change information of the target detector, and controlling the operating parameters of the target detector based on the first pose change information and the second pose change information.

The second pose change information may be obtained according to the first manner of implementation of controlling the operating parameters of the target detector based on the first pose change information, which will not be described again here.

In one embodiment, the target detector may be independent of the electronic device, and may also change its pose (for example, the target detector may move). When the pose of the target detector changes, the operating parameters of the target detector may be controlled by combining the pose change information of the electronic device and the pose change information of the target detector. For example, the detection region or the power consumption state may be controlled.

Further, in some embodiments, the operating parameters of the target detector may be controlled according to a pose change amount of the electronic device in the first pose change information. Controlling the operating parameters of the target detector according to the pose change amount may include at least one of the following manners.

(1) When the first pose change information indicates that the pose change amount of the electronic device is larger than a first threshold, the operating parameters of the target detector may be controlled according to the pose change amount.

The pose change amount may include an angle or a distance, etc. When the pose change amount is larger than the first threshold, for example, when the pose change amount of the electronic device is relatively large, according to the change value of the angle or distance in the pose change amount, the detection angle of the target detector or the relative positional relationship between the target detector and the electronic device may be accurately adjusted, such that the target detector adapts to the pose change of the electronic device to improve the detection accuracy of the target detector.

(2) When the first pose change information indicates that the pose change amount of the electronic device is larger than a second threshold, the target detector may be controlled to have a first detection region and/or a first power consumption state.

The first threshold and the second threshold may be the same or different. The target detector in different poses may be preset to have corresponding detection regions and/or power consumption states. The first detection region may be a detection region corresponding to a preset detection range and detection direction, and the first power consumption state may be a preset power intensity corresponding to a preset power value. When the pose change amount is larger than the second threshold, the target detector may be controlled to switch to the corresponding detection range and/or detection direction to perform data detection, or may be controlled to perform data detection under the preset power intensity, based on the mapping relationship between the detection regions and/or power consumption states of the target detector in the different pose.

In one embodiment, controlling the detection region and/or power consumption state of the target detector may involve interval regulation or quantitative regulation. For example, in one embodiment, the first pose change information of the electronic device may represent that the screen of the electronic device is turned upward at a certain angle. When the angle at which the electronic device is turned exceeds the second threshold, the detection direction of the target detector may be adjusted according to the set angle, or the power may be increased for a certain intensity.

(3) When the first pose change information indicates that the pose change amount of the electronic device is larger than a third threshold, the operating parameters of the target detector may be controlled according to a difference between the pose change amount and the third threshold.

The first threshold, the second threshold, and the third threshold may be the same or different. The difference between the pose change amount and the third threshold may be used to characterize the amplitude of the pose change of the electronic device. When the difference is large, the amplitude of the pose change of the electronic device may be larger.

In one embodiment, according to the pose change amount of the electronic device, the operating parameters of the target detector may be fine-tuned or roughly adjusted or quantitatively increased according to a predetermined interval, to perform privacy protection on the electronic device according to the detection data of the adjusted target detector.

In some embodiments, further, controlling the operating parameters of the target detector according to the pose change amount may include driving the target detector through a drive assembly to control the detection region of the target detector.

In one embodiment, driving the target detector to control the detection region of the target detector may include:

when the first pose change information indicates that the pose change amount of the electronic device is larger than a fourth threshold, controlling a first drive assembly of the target detector to drive a target detection device of the target detector to move, to at least adjust the detection region of the target detector.

Figure 5:
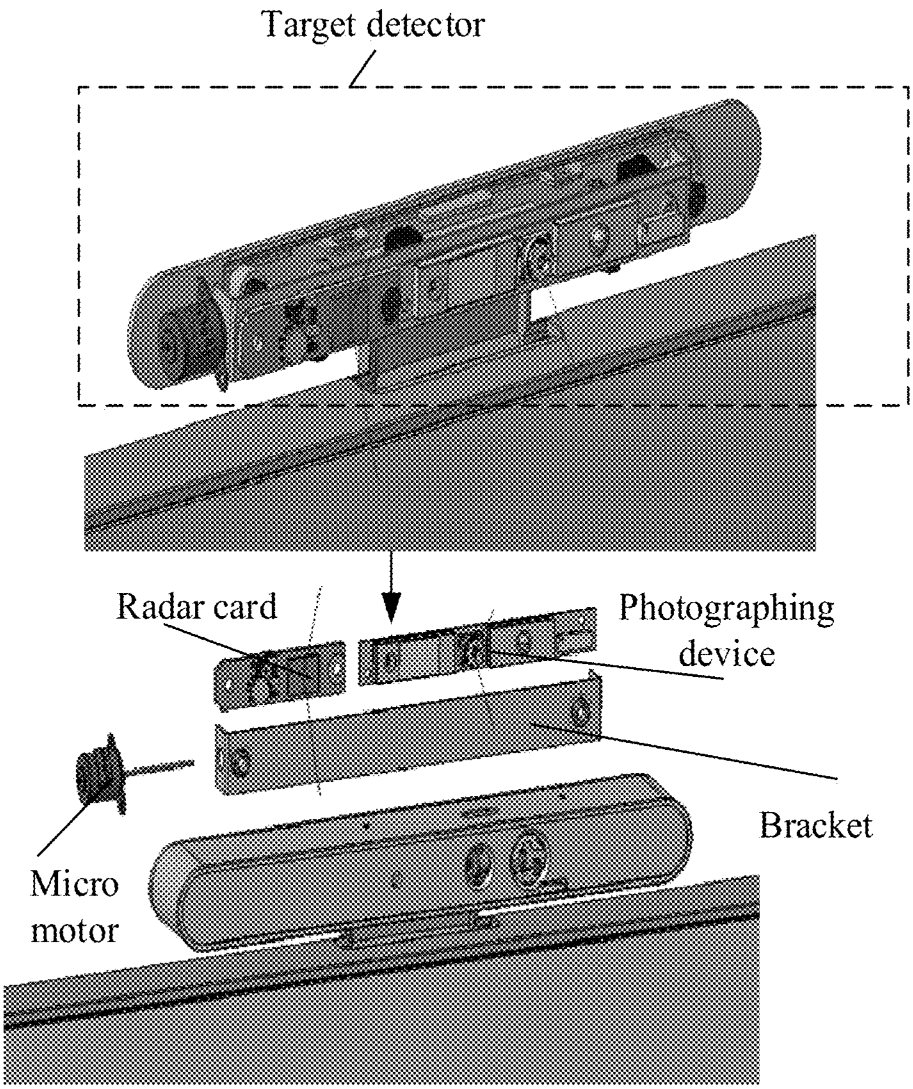
FIG. 5 is a schematic diagram showing an internal structure of a target detector consistent with the present disclosure.

In some embodiments, the target detection device of the target detector may include a radar and/or a photographing device. The first drive assembly of the target detector may include a micro motor. The micro motor may include a reduction gear set. The micro motor may be connected to the target detection device through a bracket (as shown in FIG. 5 showing a target detector including a micro motor, a bracket, a radar card and a photographing device). By controlling the rotation or movement of the micro motor, the bracket connected to the micro motor may rotate or move, to adjust the detection region of the target detection device according to the rotation or movement of the bracket. In one embodiment, when the target detection device of the target detection component includes a radar and a photographing device, the movement of the radar or the photographing device may be controlled individually through the first drive assembly.

In another embodiment, driving the target detector to control the detection region of the target detector may include:

when the first pose change information indicates that the pose change amount of the electronic device is larger than a fifth threshold, controlling a second drive assembly outside the target detector to drive the target detector to move with respect to the electronic device, to at least adjust the detection region of the target detection device of the target detector, where the fifth threshold may be larger than the fourth threshold.

Figure 6:
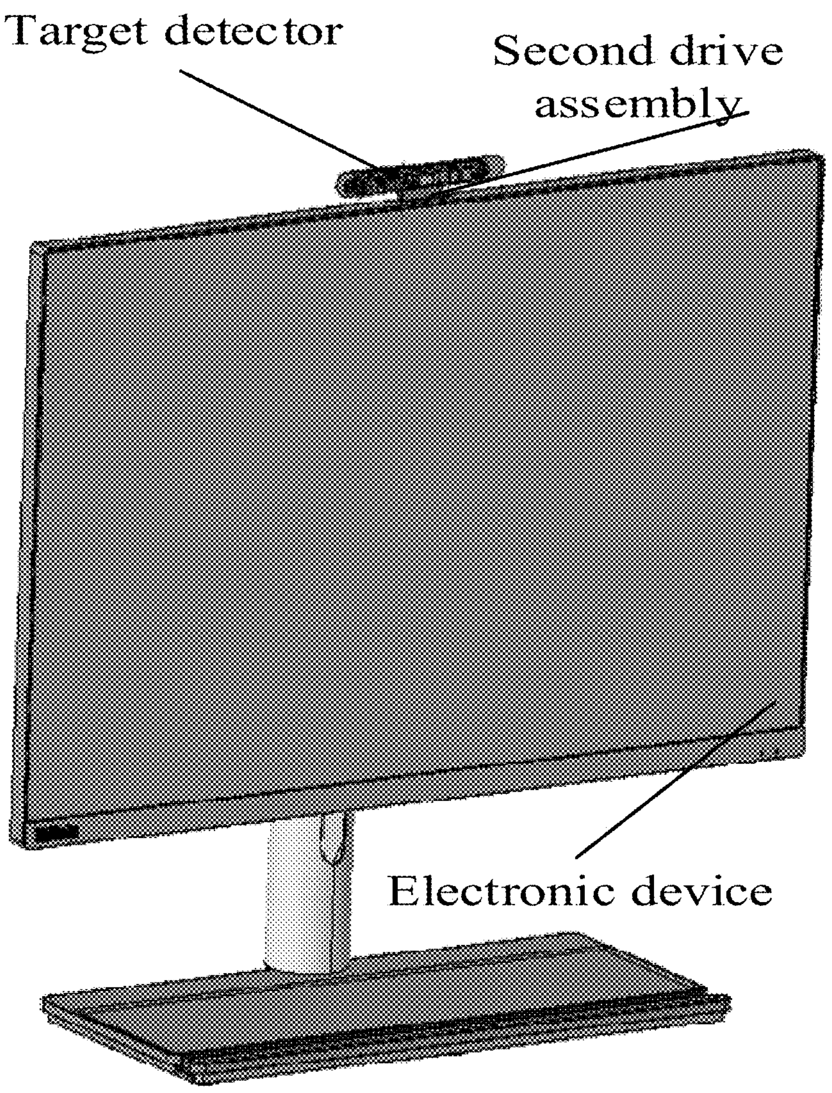
FIG. 6 is a schematic structural diagram showing a target detector connected to an electronic device through a second drive assembly consistent with the present disclosure.

In one embodiment, the target detector may be connected to a body of the electronic device through the second drive assembly (as shown in FIG. 6). When the pose change amount of the electronic device is larger than the fifth threshold, the change in the pose of the electronic device may be relatively large, and the target detector may be controlled to move as a whole through the second drive assembly. When the overall pose of the target detector changes, the detection region of the target detection device of the target detector may change.

When the pose change amount of the electronic device is larger than the fourth threshold, it may be determined that the change in the pose of the electronic device is small, and the target detection device of the target detector may be controlled to move individually through the first driving device, to fine-tune the detection region of the target detection device. When the pose change amount of the electronic device is larger than the fifth threshold, it may be determined that the change in the pose of the electronic device is large, and the target detector may be controlled to move as a whole through the second drive assembly, such that the detection region of the target detection device may be greatly adjusted.

In some embodiments, the electronic device may be connected to a plurality of detectors, and the plurality of detectors may include multiple detectors carried by the electronic device itself and/or multiple detectors externally connected to the electronic device. The external connection with the electronic device may include a physical connection or a wireless communication connection. After the pose of the electronic device changes, a target detector for data detection on the electronic device may be selected from the plurality of detectors connected to the electronic device. The process of determining the target detector may include: determining the target detector at least based on the first pose change information.

In one embodiment, determining the target detector at least based on the first pose change information may include:

determining the target detector based on the first pose change information and a relative position relationship between each of the plurality of detectors and the electronic device.

The relative position of one detector may be: a relative positional relationship between an installation position of the detector and an installation position of the electronic device, or a relative positional relationship between an installation region of the detector and an installation region of the electronic device, etc. The relative positional relationship between the detector and the electronic device may be a positional relationship between the detector and the screen or audio component of the electronic device, etc.

In one embodiment, the relationship between the detection region of each detector and the input/output direction of the display screen or audio component after the change may be determined based on the first pose change information and the relative position relationship, and the target detector may be determined from the plurality of detectors according to the relationship between the detection region of each detector and the input/output direction of the display screen or audio component. For example: the output parameter of the electronic device may include a display output parameter. Further, based on the first pose change information of the electronic device and the relative position relationship between the plurality of detectors and the electronic device, it may be determined that one detector is set on the back of the display screen of the electronic device. At this time, the detection region of the detector is not able to be adjusted to the front of the display screen. Therefore, the privacy protection requirements for the electronic device may not be met and the detector may not be set as the target detector.

In another embodiment, determining the target detector at least based on the first pose change information may include:

determining the target detector based on the first pose change information and configuration parameters of each of the plurality of detectors.

The configuration parameters of one detector may include the type, coverage, power, attribute information of the collected data, or an adjustment range of the detector. The dynamic capture capability, collection frame rate, coverage, etc. of each detector may be used to determine which detector may be used to perform the detection task. The input/output direction of the display screen or audio component of the electronic device may be determined based on the pose change information, and the target detector may be determined based on the configuration parameters of each of the plurality of detectors.

For example, in one embodiment, the output parameters of the electronic device may include sound output parameters. According to the configuration parameters of each of the plurality of detectors, one detector whose type is audio detection and whose coverage range is in the audio input/output direction may be determined as the target detector.

In another embodiment, determining the target detector at least based on the first pose change information may include:

determining the target detector based on the first pose change information and third pose change information of each of the plurality of detectors.

In the present embodiment, the relative position relationship between each of the plurality of detectors may be determined based on the first pose change information and third pose change information of the detector. When the relative positional relationship between the electronic device and one detector meets the privacy protection requirements of the detector for the electronic device, the detector may be determined as the target detector.

For example, the component position of the display screen and/or audio component of the electronic device may be determined based on the first pose change information, and the module position of each detector may be determined based on the second pose change information. Then, the relative position relationship between the electronic device and the detector may be determined based on the component position and the module position. When the relative positional relationship indicates that the detector is located at the top or side of the display screen or audio component, or the top of the bracket of the electronic device, the detector may be determined as the target detector.

In some embodiments, the relative position between the detector and the electronic device may be the relative position between the installation position of the detector and the installation position of the electronic device, or the relative position between the installation region of the detector and the installation region of the electronic device.

In some embodiments, the plurality of detectors connected to the electronic device may include multiple detectors carried by the electronic device itself and/or multiple detectors externally connected to the electronic device. For the plurality of detectors connected to the electronic device by different manners, determining the target detector at least based on the first pose change information may include at least one of the following manners.

(1) A first detector located at the electronic device may be determined as the target detector based on at least the first pose change information.

The pose of the electronic device may be determined based on the first pose change information. In this pose, the detection range of the first detector located at the electronic device may be determined. When the detection range of the first detector is able to cover the input/output range of the display screen or audio component of the electronic device in this pose, the first detector may be determined to be the target detector.

(2) Based on at least the first pose change information, a first detector and a second detector located at the electronic device may be determined as the target detector.

The first detector and the second detector may be different types or the same type of detectors. The pose of the electronic device may be determined based on the first pose change information. When the detection ranges or the detection regions of the first detector and the second detector are able to cover the input/output range of the display screen or audio component of the electronic device after the pose change of the electronic device, the first detector and the second detector may be determined as the target detector cooperatively.

In some embodiments, the plurality of detectors may be provided at the electronic device, and the positional relationship between each of the plurality of detectors on the electronic device and the configuration parameters of each of the plurality of detectors on the electronic device may be determined. The configuration parameters of one detector may include a detection type, coverage, detection power, etc. When the positional relationship between multiple detectors meets the set location conditions, and the combined configuration parameters of the multiple detectors are able to meet the data detection requirements of the electronic device in this pose, the multiple detectors may be determined as the target detector cooperatively.

For example, in one embodiment, the first detector may be a radar, and the second detector may be a photographing device. Correspondingly, the detection type of the first detector may be radar detection, and the detection type of the second detector may be photographing detection. When the data detection requirement of the electronic device is performing radar detection and photographing on the input/output range of the electronic device at the same time, and the detection ranges of the first detector and the second detector are both able to cover the input/output range, the first detector and the second detector may be determined as the target detector cooperatively.

(3) At least one third detector that does not belong to the electronic device may be determined as the target detector based on at least the first pose change information.

The detection range of the at least one third detector that does not belong to the electronic device may be determined. The pose of the electronic device may be determined based on the first pose change information. When the detection range of the at least one third detector is able to cover the input/output range of the display screen or audio component of the electronic device in this pose, the at least one detector may be determined to be the target detector.

(4) Based on at least the first pose change information, the first detector located at the electronic device and at least one third detector not belonging to the electronic device may be determined as the target detector cooperatively.

The pose of the electronic device may be determined based on the first pose change information. When the electronic device is connected to the plurality of third detectors that do not belong to the electronic device, the relative positional relationship between each third detector and the electronic device in the final pose of the electronic device, the configuration parameters of the first detector belonging to the electronic device itself, and the configuration parameters of each third detector may be determined. When the relative positional relationship between at least one third detector and the electronic device meets the privacy protection requirements for the electronic device, and the configuration parameters of the combination of the first detector and the at least one third detector meet the data detection requirements of the electronic device in the pose, the first detector and the at least one third detector may be determined as the target detector.

In some embodiments, when the number of the target detectors determined to perform data detection on the electronic device is multiple, each target detector may perform data interaction through wireless communication to work cooperatively.

In one embodiment, the relative positional relationship between the detector and the electronic device may be the positional relationship between the detector and the display screen or audio component of the electronic device.

In the present disclosure, at least one target detector may be determined by combining the relative position relationship between the detector and the electronic device, the configuration parameters of the detector, and the pose change information, to perform data detection on the electronic device through the at least one target detector. The output parameters of the electronic device may be controlled through the detection data of the at least one target detector, to perform privacy protection of the output parameters of the electronic device.

In one embodiment, after controlling the operating parameters of the target detector, the target detector may perform the detection task according to the operating parameters, to obtain the detection data of the target detector and use the detection data of the target detector to control the output parameters of the electronic device.

In one embodiment, using the detection data of the target detector to control the output parameters of the electronic device may include:

when the detection data indicates that the electronic device does not have a target output object, controlling the electronic device to switch to a first operating mode.

In the first operating mode, the electronic device may not perform display data output and/or audio data output.

In one embodiment, the target output object may include a target customer or a target user. The first operating mode may be a sleep mode, a screen-off mode, a playback pause mode, and so on.

For example, when the target user is not in front of the display screen of the electronic device, the display screen of the electronic device may be controlled not to play display data. Or, when the target user is not within the audio playback range of the electronic device, the audio component of the electronic device may be controlled not to play audio data.

In one embodiment, when the electronic device is in the first operating mode for a long time, the electronic device may be controlled to enter the shutdown mode, or a mode switching prompt of the electronic device may be sent to a user terminal to operate the electronic device through the user terminal. After receiving the mode switching instruction sent by the user terminal, the electronic device may be shut down according to the mode switching instruction, or the output data of the electronic device may be stored and then the electronic device may be shut down, or the output data of the electronic device may be synchronized to the user terminal, etc.

In one embodiment, using the detection data of the target detector to control the output parameters of the electronic device may include:

when the detection data indicates that the electronic device meets anti-peeping processing conditions, controlling the display output parameters of a target display region of the electronic device, or controlling the display output parameters of the electronic device and a target display device. The target display device may be a device capable of establishing a first communication connection with the electronic device.

When the output parameters include the display output parameters and the detection data of the target detector indicates that there is a non-target object entering a peeping region of the electronic device, the electronic device may meet the anti-peeping processing conditions.

In one embodiment, when the anti-peeping processing conditions are met, the anti-peeping processing may include controlling the display output parameters of the target display region. The target display region may be a local region or a global region in the display screen of the electronic device.

In another embodiment, when the anti-peeping processing conditions are met, the anti-peeping processing may include connecting the target display device and controlling the display output parameters of the target display device and the electronic device. The target display may include an AR/VR or other type of device. The private data may be projected to the meta device worn by the user for display output by connecting to the electronic device.

In one embodiment, using the detection data of the target detector to control the output parameters of the electronic device may include:

- when the detection data indicates that the electronic device meets audio monitor processing conditions, controlling the audio output parameters of the electronic device and a target audio output device. The target audio output device may be a device capable of establishing a second communication connection with the electronic device.

When the output parameters include audio output parameters and the detection data of the target detector indicates that there is a target audio output device within the audio coverage range, the electronic device may meet the audio monitor processing conditions.

When the audio monitor processing conditions are met, the electronic device may be controlled to be connected to the target audio output device. The target audio output device may be a device such as a headphone or a speaker. The audio data may be transmitted to the target audio output device for playback by connecting to the electronic device.

In one embodiment, when the audio monitor processing conditions are met, the audio component of the electronic device itself may be controlled to play the audio data.

In the present disclosure, it may be determined whether the electronic device meets the anti-peep processing conditions or the audio monitor processing conditions according to the detection data of the target detector. When the anti-peep processing conditions or the audio monitor processing conditions are met, the display output parameters or audio output parameters of the electronic device may be controlled to protect the privacy of the output parameters of the electronic device.

The specific implementation processes of each of the above embodiments and their derivatives are within the protection scope of the present disclosure.

The present disclosure also provides a control device to implement the control method provided by various embodiments of the present disclosure. The control device provided by the embodiments of the present disclosure may be applied to computer terminals or various mobile devices.

Figure 7:
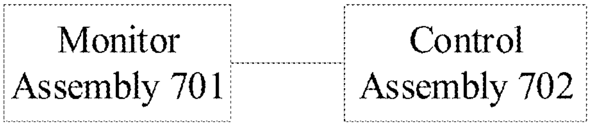
FIG. 7 is a schematic structural diagram showing a control device consistent with the present disclosure.

In one embodiment shown in FIG. 7, the control device includes:

- a monitor assembly 701, used to monitor first pose change information of an electronic device; and
- a control assembly 702, used to control operating parameters of a target detector based on the first pose change information, such that the detection data of the target detector is used to control the output parameters of the electronic device.

The target detector may belong or not belong to the electronic device.

In the present disclosure, by monitoring the first pose change information of the electronic device, the operating parameters of the target detector may controlled, such that the target detector is able to work under the operating parameters to control the output parameters of the electronic device according to the obtained detection data of the target detector. The operating parameters of the detector may be controlled when the pose of the electronic device changes. Therefore, the operating parameters may be adjusted in time according to the changes in the electronic device, such that the detector after adjusting the operating parameters is used to perform data detection on the electronic device to obtain more accurate detection data and protect the privacy of output data of the electronic device.

In one embodiment, when the monitor assembly 701 is configured to detect the first pose change information of the electronic device, the monitor assembly 701 may be used to perform at least one of:

- using collected data of at least one sensor provided at the electronic device to monitor the first pose change information of the electronic device;
- using pose data returned by at least one sensor provided at the target detector disposed at the electronic device to monitor the first pose change information of the electronic device;
- using the detection data of the target detector to monitor the first pose change information of the electronic device, where the target detector is located or not located at the electronic device;
- obtaining control information that is applied to the electronic device and obtaining the first pose change information of the electronic device based on the control information, where the control information may trigger the pose change of the electronic device; or
- based on interactive data between the electronic device and a target object, monitoring the first pose change information of the electronic device.

In one embodiment, when controlling the operating parameters of the target detector according to the first pose change information, the control assembly 702 may be used to perform at least one of:

- determining second pose change information of the target detector based on the first pose change information, and controlling detection region of the target detector based on the second pose change information, to at least make the detection region of the target detector match the first pose change information of the electronic device;
- obtaining relative position relationship between the target detector and the electronic device, and controlling the detection region of the target detector based on the first pose change information and the relative position relationship;
- controlling a power consumption state of the target detector based on the first pose change information; or
- obtaining the second pose change information of the target detector, and controlling the operating parameters of the target detector based on the first pose change information and the second pose change information.

In some embodiments, when controlling the operating parameters of the target detector according to the first pose change information, the control assembly 702 may be used to perform at least one of:

- when the first pose change information indicates that the pose change amount of the electronic device is larger than a fourth threshold, controlling a first drive assembly of the target detector to drive a target detection device of the target detector to move, to at least adjust the detection region of the target detection device; or
- when the first pose change information indicates that the pose change amount of the electronic device is larger than a fifth threshold, controlling a second drive assembly outside the target detector to drive the target detector to move with respect to the electronic device, to at least adjust the detection region of the target detection device of the target detector, where the fifth threshold is larger than the fourth threshold.

In one embodiment, the control device may further include:

a determination module, configured to determine the target detector according to at least the first pose change information.

In one embodiment, the electronic device may be connected to a plurality of detectors.

The determination module may be configured to perform at least one of:

determining the target detector based on the first pose change information and the relative position relationship between each detector and the electronic device;

determining the target detector based on the first pose change information and configuration parameters of each detector; or determining the target detector based on the first pose change information and third pose change information of each detector.

In some embodiments, the determination module may be configured to perform at least one of:

determining a first detector located at the electronic device as the target detector based on at least the first pose change information;

determining a first detector and a second detector located at the electronic device as the target detectors based on at least the first pose change information;

determining at least one third detector that does not belong to the electronic device as the target detector based on at least the first pose change information; or determining a first detector located at the electronic device and at least one third detector that does not belong to the electronic device as the target detector based on at least the first pose change information.

In one embodiment, when using the detection data of the target detector to control the output parameters of the electronic device, the control assembly may be configured to perform at least one of:

when the detection data indicates that the electronic device does not have a target output object, controlling the electronic device to switch to a first operating mode, where the electronic device does not execute display data and/or audio data output in the first operating mode;

when the detection data indicates that the electronic device meets anti-peeping processing conditions, controlling the display output parameters of a target display region of the electronic device, or controlling the display output parameters of the electronic device and a target display device, where the target display device is a device capable of establishing a first communication connection with the electronic device; or when the detection data indicates that the electronic device satisfies the audio monitor processing condition, controlling the audio output parameters of the electronic device and the target audio output device, where the target audio output device is a device capable of establishing a second communication connection with the electronic device.

For the detailed operating process of each unit in the control device provided by various embodiments of the present disclosure, the reference may be made to the description of the control method provided by various embodiments of the present disclosure.

Figure 8:
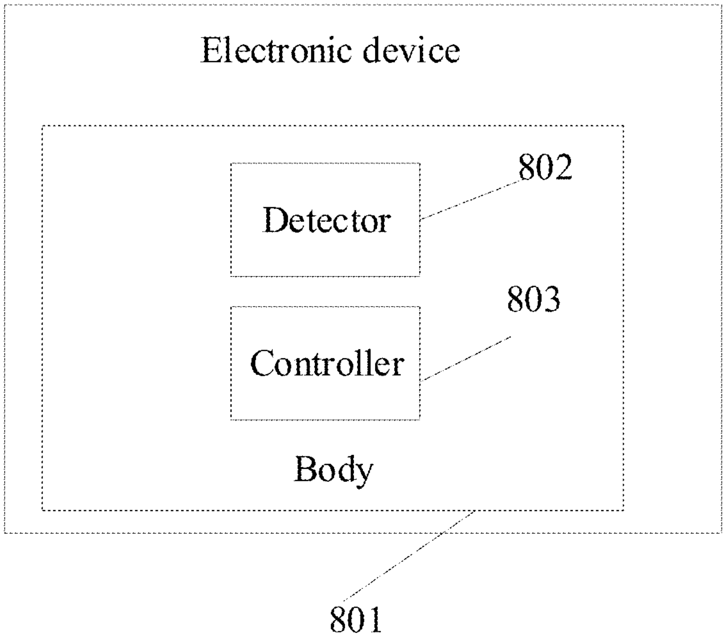
FIG. 8 is a schematic structural diagram showing an electronic device consistent with the present disclosure.

The present disclosure also provides an electronic device. As shown in FIG. 8, in one embodiment, the electronic device includes:

a body 801 capable of having different poses;

at least one detector 802, disposed at the body 801 for obtaining detection data; and a controller 803 disposed at the body 801, configured to control the operating parameters of a target detector 802 according to the obtained pose change information of the electronic device, such that the detection data of the target detector 802 is used to control the output parameters of the electronic device.

The target detector 802 may be at least one of the at least one detector 802. The controller 803 may be a center processing unit or a control chip (such as PCH) of the electronic device.

In one embodiment, in the actual application of the present disclosure, a gravity sensor may be connected to a sensor interface of the PCH. The gravity sensor may detect the pose change of the electronic device every 200 ms. When the pose of the electronic device changes, the gravity sensor may transmit the data of the pose change to the PCH through the I2C protocol. The electronic device may start a corresponding control process according to the transmitted data. The screen change value of the electronic device may be read in real time, thereby triggering the rotation of the motor in the detector, compensating and adjusting the vertical orientation of the radar and camera in the detector to a reasonable direction. The accuracy of intruder detection and the photographing location accuracy of the camera may be improved.

Each embodiment in this specification is described in a progressive manner, and each embodiment focuses on the difference from other embodiments. Same and similar parts of each embodiment may be referred to each other. As for the device disclosed in the embodiments, since it corresponds to the method disclosed in the embodiments, the description is relatively simple, and for relevant details, the reference may be made to the description of the method embodiments.

Units and algorithm steps of the examples described in conjunction with the embodiments disclosed herein may be implemented by electronic hardware, computer software or a combination of the two. To clearly illustrate the possible interchangeability between the hardware and software, in the above description, the composition and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present disclosure.

In the present disclosure, the drawings and descriptions of the embodiments are illustrative and not restrictive. The same drawing reference numerals identify the same structures throughout the description of the embodiments. In addition, figures may exaggerate the thickness of some layers, films, screens, areas, etc., for purposes of understanding and ease of description. It will also be understood that when an element such as a layer, film, region or substrate is referred to as being "on" another element, it may be directly on the another element or intervening elements may be present. In addition, "on" refers to positioning an element on or below another element, but does not essentially mean positioning on the upper side of another element according to the direction of gravity.

The orientation or positional relationship indicated by the terms "upper," "lower," "top," "bottom," "inner," "outer," etc. are based on the orientation or positional relationship shown in the drawings, and are only for the convenience of describing the present disclosure, rather than indicating or implying that the device or element referred to must have a specific orientation, be constructed and operated in a specific orientation, and therefore cannot be construed as a limitation of the present disclosure. When a component is described as being "connected" to another component, it may be directly connected to the other component or there may be an intermediate component present at the same time.

The disclosed equipment and methods may be implemented in other ways. The device embodiments described above are only illustrative. For example, the division of the units is only a logical function division. In actual implementation, there may be other division methods, such as: multiple units or components may be combined, or can be integrated into another system, or some features can be ignored, or not implemented. In addition, the coupling, direct coupling, or communication connection between the components shown or discussed may be through some interfaces, and the indirect coupling or communication connection of the devices or units may be electrical, mechanical, or other forms.

The units described above as separate components may or may not be physically separated. The components shown as units may or may not be physical units. They may be located at one place or distributed to multiple network units. Some or all of the units may be selected according to actual needs to achieve the purpose of the solution of the present disclosure.

In addition, all functional units in the embodiments of the present disclosure may be integrated into one processing unit, or each unit may be separately used as a unit, or two or more units can be integrated into one unit. The above-mentioned integration units can be implemented in the form of hardware or in the form of hardware plus software functional units.

All or part of the steps to implement the above method embodiments may be completed by hardware related to program instructions. The aforementioned program may be stored in a computer-readable storage medium. When the program is executed, the steps including the above method embodiments may be executed. The aforementioned storage media may include: removable storage devices, ROMs, magnetic disks, optical disks or other media that can store program codes.

When the integrated units mentioned above in the present disclosure are implemented in the form of software function modules and sold or used as independent products, they may also be stored in a computer-readable storage medium. Based on this understanding, the technical solutions of the embodiments of the present disclosure in essence or those that contribute to the existing technology may be embodied in the form of software products. The computer software products may be stored in a storage medium and include a number of instructions for instructing the product to perform all or part of the methods described in various embodiments of the present disclosure. The aforementioned storage media may include: random access memory (RAM), read-only memory (ROM), electrical-programmable ROM, electrically erasable programmable ROM, register, hard disk, mobile storage device, CD-ROM, magnetic disks, optical disks, or other media that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. A control method comprising:

monitoring pose change information of an electronic device;

selecting a target detector from a plurality of detectors connected to the electronic device at least based on the pose change information, including determining the target detector based on the pose change information and at least one of: a relative position relationship between each of the plurality of detectors and the electronic device; a configuration parameter of each of the plurality of detectors; or pose change information of each of the plurality of detectors, wherein the determining the target detector includes determining, for each of the plurality of detectors, a relationship between a detection region of the detector after a pose change indicated by the pose change information and an input/output range of a display screen or an audio component of the electronic device, and selecting, as the target detector, a detector of the plurality of detectors whose detection region covers the input/output range; and controlling an operating parameter of the target detector based on the pose change information, to control an output parameter of the electronic device according to detection data of the target detector.

2. The method according to claim 1, wherein monitoring the pose change information includes monitoring the post change information using at least one of:

collected data of at least one sensor provided at the electronic device;

pose data returned by at least one sensor provided at the target detector;

the detection data;

control information applied to the electronic device, the control information being configured to trigger pose change of the electronic device; or interactive data between the electronic device and a target object.

3. The method according to claim 1, wherein:

the pose change information is first pose change information; and controlling the operating parameter includes at least one of:

determining second pose change information of the target detector based on the first pose change information, and controlling a detection region of the target detector based on the second pose change information, to at least cause the detection region of the target detector match the first pose change information of the electronic device;

obtaining a relative position relationship between the target detector and the electronic device, and controlling the detection region of the target detector based on the first pose change information and the relative position relationship;

controlling a power consumption state of the target detector based on the first pose change information; or obtaining the second pose change information of the target detector, and controlling the operating parameters of the target detector based on the first pose change information and the second pose change information.

4. The method according to claim 1, wherein controlling the operating parameter includes at least one of:

in response to the pose change information indicating that a pose change amount of the electronic device is larger than a first threshold, controlling the operating parameter of the target detector based on the pose change amount;

in response to the pose change information indicating that the pose change amount of the electronic device is larger than a second threshold, controlling at least one of a detection region or a power consumption state of the target detector; or in response to the pose change information indicating that the pose change amount of the electronic device is larger than a third threshold, controlling the operating parameter of the target detector based on a difference between the pose change amount and the third threshold.

5. The method according to claim 1, wherein controlling the operating parameter includes at least one of:

in response to the pose change information indicating that a pose change amount of the electronic device is larger than a first threshold, controlling a first drive assembly of the target detector to drive a target detection device of the target detector to move, to at least adjust a detection region of the target detection device; or in response to the pose change information indicating that the pose change amount of the electronic device is larger than a second threshold, controlling a second drive assembly outside the target detector to drive the target detector to move with respect to the electronic device, to at least adjust the detection region of the target detection device of the target detector, the second threshold being larger than the first threshold.

6. The method according to claim 1, wherein determining the target detector based on at least the pose change information includes determining at least one of a first detector located at the electronic device, a second detector located at the electronic device, or at least one third detector not belonging to the electronic device as the target detector based on at least the pose change information.

7. The method according to claim 1, wherein controlling the output parameter of the electronic device includes at least one of:

in response to the detection data indicating that the electronic device does not have a target output object, controlling the electronic device to switch to an operating mode in which the electronic device does not output at least display data or audio data;

in response to the detection data indicating that the electronic device meets an anti-peering processing condition, controlling a display output parameter of a target display region of the electronic device or controlling display output parameters of the electronic device and a target display device capable of establishing a first communication connection with the electronic device; or in response to the detection data indicating that the electronic device meets an audio monitoring processing condition, controlling audio output parameters of the electronic device and a target audio output device capable of establishing a second communication connection with the electronic device.

8. A control device comprising:

a processor; and a memory coupled to the processor, the memory storing instructions which, when executed by the processor, cause the processor to:

monitor pose change information of an electronic device;

select a target detector from a plurality of detectors connected to the electronic device at least based on the pose change information, including determining the target detector based on the pose change information and at least one of: a relative position relationship between each of the plurality of detectors and the electronic device; a configuration parameter of each of the plurality of detectors; or pose change information of each of the plurality of detectors, wherein the determining the target detector includes determining, for each of the plurality of detectors, a relationship between a detection region of the detector after a pose change indicated by the pose change information and an input/output range of a display screen or an audio component of the electronic device, and selecting, as the target detector, a detector of the plurality of detectors whose detection region covers the input/output range; and control an operating parameter of the target detector based on the pose change information, to control an output parameter of the electronic device according to detection data of the target detector.

9. The control device according to claim 8, wherein the processor is further to monitor the post change information using at least one of:

collected data of at least one sensor provided at the electronic device;

pose data returned by at least one sensor provided at the target detector;

the detection data;

control information applied to the electronic device, the control information being configured to trigger pose change of the electronic device; or interactive data between the electronic device and a target object.

10. The control device according to claim 8, wherein:

the pose change information is first pose change information; and the processor is further to perform at least one of:

determining second pose change information of the target detector based on the first pose change information, and controlling a detection region of the target detector based on the second pose change information, to at least cause the detection region of the target detector match the first pose change information of the electronic device;

obtaining a relative position relationship between the target detector and the electronic device, and controlling the detection region of the target detector based on the first pose change information and the relative position relationship;

controlling a power consumption state of the target detector based on the first pose change information; or obtaining the second pose change information of the target detector, and controlling the operating parameters of the target detector based on the first pose change information and the second pose change information.

11. The control device according to claim 8, wherein the processor is further to perform at least one of:

in response to the pose change information indicating that a pose change amount of the electronic device is larger than a first threshold, controlling the operating parameter of the target detector based on the pose change amount;

in response to the pose change information indicating that the pose change amount of the electronic device is larger than a second threshold, controlling at least one of a detection region or a power consumption state of the target detector; or in response to the pose change information indicating that the pose change amount of the electronic device is larger than a third threshold, controlling the operating parameter of the target detector based on a difference between the pose change amount and the third threshold.

12. An electronic device comprising:

a body configured to be in one of a plurality of different poses;

a processor; and a memory coupled to the processor, the memory storing instructions which, when executed by the processor, cause the processor to:

monitor pose change information of the electronic device;

select a target detector from a plurality of detectors connected to the electronic device at least based on the pose change information, including determining the target detector based on the pose change information and at least one of: a relative position relationship between each of the plurality of detectors and the electronic device; a configuration parameter of each of the plurality of detectors; or pose change information of each of the plurality of detectors, wherein the determining the target detector includes determining, for each of the plurality of detectors, a relationship between a detection region of the detector after a pose change indicated by the pose change information and an input/output range of a display screen or an audio component of the electronic device, and selecting, as the target detector, a detector of the plurality of detectors whose detection region covers the input/output range; and control an operating parameter of the target detector based on the pose change information of the electronic device, to control an output parameter of the electronic device according to detection data of the target detector.

13. The electronic device according to claim 12, wherein the post change information is monitored using at least one of:

collected data of at least one sensor provided at the electronic device;

pose data returned by at least one sensor provided at the target detector;

the detection data;

control information applied to the electronic device, the control information being configured to trigger pose change of the electronic device; or interactive data between the electronic device and a target object.

14. The electronic device according to claim 13, wherein:

the pose change information is first pose change information; and the processor is further to control the operating parameter by performing at least one of:

determining second pose change information of the target detector based on the first pose change information, and controlling a detection region of the target detector based on the second pose change information, to at least cause the detection region of the target detector match the first pose change information of the electronic device;

obtaining a relative position relationship between the target detector and the electronic device, and controlling the detection region of the target detector based on the first pose change information and the relative position relationship;

controlling a power consumption state of the target detector based on the first pose change information; or obtaining the second pose change information of the target detector, and controlling the operating parameters of the target detector based on the first pose change information and the second pose change information.

15. The electronic device according to claim 13, wherein the processor is further to control the operating parameter by performing at least one of:

in response to the pose change information indicating that a pose change amount of the electronic device is larger than a first threshold, controlling the operating parameter of the target detector based on the pose change amount;

in response to the pose change information indicating that the pose change amount of the electronic device is larger than a second threshold, controlling at least one of a detection region or a power consumption state of the target detector; or in response to the pose change information indicating that the pose change amount of the electronic device is larger than a third threshold, controlling the operating parameter of the target detector based on a difference between the pose change amount and the third threshold.

16. The electronic device according to claim 13, wherein the processor is further to control the operating parameter by performing at least one of:

in response to the pose change information indicating that a pose change amount of the electronic device is larger than a first threshold, controlling a first drive assembly of the target detector to drive a target detection device of the target detector to move, to at least adjust a detection region of the target detection device; or in response to the pose change information indicating that the pose change amount of the electronic device is larger than a second threshold, controlling a second drive assembly outside the target detector to drive the target detector to move with respect to the electronic device, to at least adjust the detection region of the target detection device of the target detector, the second threshold being larger than the first threshold.

17. The electronic device according to claim 12, wherein the processor is further configured to determine at least one of a first detector located at the electronic device, a second detector located at the electronic device, or at least one third detector not belonging to the electronic device as the target detector based on at least the first pose change information.

18. The electronic device according to claim 12, wherein the processor is further to control the output parameter of the electronic device by performing at least one of:

in response to the detection data indicating that the electronic device does not have a target output object, controlling the electronic device to switch to an operating mode in which the electronic device does not output at least display data or audio data;

in response to the detection data indicating that the electronic device meets an anti-peering processing condition, controlling a display output parameter of a target display region of the electronic device or controlling display output parameters of the electronic device and a target display device capable of establishing a first communication connection with the electronic device; or in response to the detection data indicating that the electronic device meets an audio monitoring processing condition, controlling audio output parameters of the electronic device and a target audio output device capable of establishing a second communication connection with the electronic device.

* * * * *